United States Patent
Nishizawa et al.

(10) Patent No.: US 9,075,284 B2
(45) Date of Patent: Jul. 7, 2015

(54) SPECTRAL WIDTH NARROWING METHOD, OPTICAL ELEMENT AND LIGHT SOURCE DEVICE

(75) Inventors: Norihiko Nishizawa, Osaka (JP); Yasuyuki Ozeki, Osaka (JP); Kazuyoshi Itoh, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 277 days.

(21) Appl. No.: 13/643,367

(22) PCT Filed: Apr. 26, 2011

(86) PCT No.: PCT/JP2011/060162
§ 371 (c)(1),
(2), (4) Date: Dec. 21, 2012

(87) PCT Pub. No.: WO2011/136220
PCT Pub. Date: Nov. 3, 2011

(65) Prior Publication Data
US 2013/0088770 A1    Apr. 11, 2013

(30) Foreign Application Priority Data
Apr. 28, 2010    (JP) .................................. 2010-103592

(51) Int. Cl.
*G02F 1/35*    (2006.01)
*G02B 6/00*    (2006.01)
(Continued)

(52) U.S. Cl.
CPC ................ *G02F 1/395* (2013.01); *H01S 3/067* (2013.01); *G02F 1/3513* (2013.01); *G02B 6/02247* (2013.01)

(58) Field of Classification Search
None
See application file for complete search history.

(56) References Cited

U.S. PATENT DOCUMENTS 6,618,531 B1    9/2003   Goto et al.
2004/0067032 A1*  4/2004   Sartori .......................... 385/123
(Continued)

FOREIGN PATENT DOCUMENTS

JP    2000-105394    4/2000
JP    2006-171677    6/2006

OTHER PUBLICATIONS

Liang, et al., "Numerical investigation on spectral compression on femtosecond soliton in a dispersion-increasing fiber", Optical Fiber Technology, vol. 15, No. 5-6, 2009, pp. 438-441.
Nishizawa, et al., "Wideband spectral compression of wavelength-tunable ultrashort soliton pulse using comb-profile fiber", Optics Express, vol. 18, No. 11, 2010, pp. 11700-11706.
Ozeki, et al., "Nearly Exact Optical Beat-to-Soliton Train Conversion Based on Comb-Like Profiled Fiber Emulating a Polynomial Dispersion Decreasing Profile", IEEE Photonics Technology Letters, vol. 17, No. 8, 2005, pp. 1698-1700.
(Continued)

*Primary Examiner* — Hemang Sanghavi
(74) *Attorney, Agent, or Firm* — Hamre, Schumann, Mueller & Larson, P.C.

(57) ABSTRACT

The present invention provides a method for narrowing a spectral width that can also be adapted to an ultrashort optical pulse emitted from a wavelength tunable light source, and that can provide an output optical pulse with a narrow spectral width and a low noise component, and an optical element and a light source device that use the method for narrowing a spectral width. The method includes using an optical waveguide member (2) to cause a soliton effect in an input optical pulse (1) within the optical waveguide member (2), thereby narrowing a spectral width of the input optical pulse (1) to provide an output optical pulse (3), the optical waveguide member (2) having dispersion characteristics such that the average of a second-order dispersion value ($\beta 2$) with respect to the input optical pulse (1) is negative, and the absolute value of the second-order dispersion value ($\beta 2$) increases in a propagation direction of the input optical pulse (1).

11 Claims, 9 Drawing Sheets

(51) Int. Cl.
*G02F 1/39* (2006.01)
*H01S 3/067* (2006.01)
*G02B 6/02* (2006.01)

(56) References Cited

U.S. PATENT DOCUMENTS

2006/0051039 A1* 3/2006 Wei .............................. 385/123
2007/0297810 A1* 12/2007 Tomaru ......................... 398/200
2009/0092400 A1* 4/2009 Igarashi et al. ............... 398/141
2012/0177332 A1* 7/2012 Katagiri et al. .............. 385/122

OTHER PUBLICATIONS

Fan, et al., "Simultaneous pulse compression and extinction ratio improvement of gain-switched lasers using comb-like dispersion profiled fiber for OTDM system application", Optical Communication, Sep. 30, 2011, pp. 606-607.

Chernikov, et al., "Comblike dispersion-profiled fiber for soliton pulse train generation", Optics Letters, Optical Society of America, vol. 19, No. 8, Apr. 15, 1994, pp. 539-541.

* cited by examiner

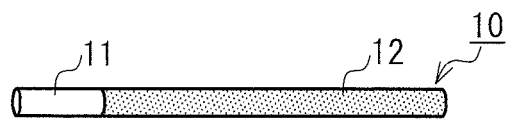
FIG. 3A
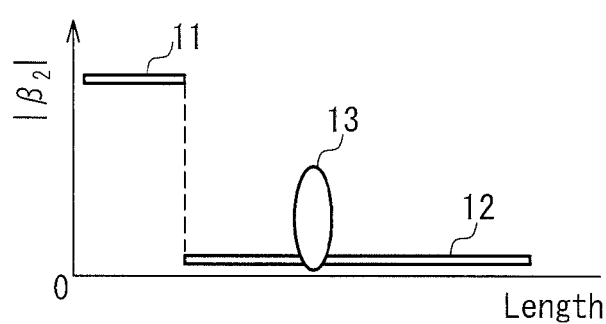
FIG. 3B
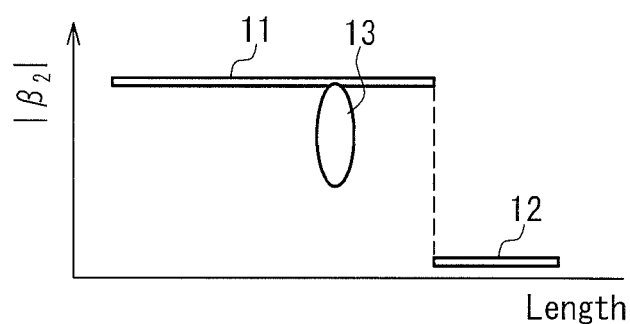
FIG. 3C
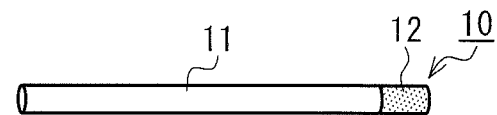
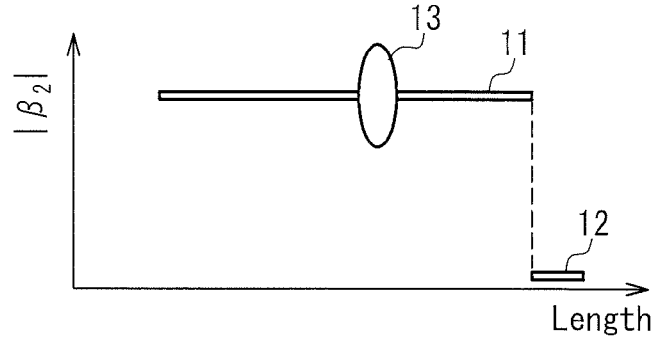

SPECTRAL WIDTH NARROWING METHOD, OPTICAL ELEMENT AND LIGHT SOURCE DEVICE

TECHNICAL FIELD

The present invention relates to a method for narrowing a spectral width that narrows the spectral width of an optical pulse, an optical element that uses this method to narrow the spectral width of input light and emits output light, and a light source that emits an optical pulse in which the spectral width has been narrowed.

BACKGROUND ART

In the fields of optical measurement and opto-electronics, a wavelength tunable light source capable of changing the wavelength over a wide band has become increasingly important.

In the case of a semiconductor laser, which is used as a conventional wavelength tunable light source, the variable wavelength band is limited to the gain band, and therefore the wavelength cannot be greatly changed. For example, a method for changing the wavelength by rotating a diffraction grating also has been proposed. However, this method requires mechanical sweeping and cannot achieve high-speed wavelength conversion.

To solve these problems, as a light source capable of changing the wavelength without adjustment of the optical system, Patent Document 1 proposes an apparatus that includes a laser light source for generating an ultrashort optical pulse on the order of femtoseconds (fs), a regulator for regulating the wavelength characteristics of the generated ultrashort optical pulse, and an optical fiber for receiving the ultrashort optical pulse whose characteristics have been regulated by the regulator.

The wavelength tunable light source of Patent Document 1 uses the soliton effect that is the interaction between self-phase modulation and wavelength dispersion, and thus allows the optical pulse to be an ideal soliton pulse in the optical fiber. As the optical pulse propagates in the optical fiber, the pulse wavelength shifts to the long wavelength side due to the soliton self-frequency shift effect of the optical fiber. Moreover, the amount of wavelength shift is controlled by adjusting the length of the optical fiber and the intensity of the ultrashort optical pulse input to the optical fiber, so that the ultrashort optical pulse to be generated can have a desired center wavelength.

PRIOR ART DOCUMENTS

Patent Documents

Patent Document 1: JP 2000-105394A

DISCLOSURE OF INVENTION

Problem to be Solved by the Invention

An optical pulse source that emits an optical pulse is used as a light source for an optical tomographic measurement, spectroscopy, optical communications, or a nonlinear microscope. The optical pulse source used as a light source for these optical instruments needs to be able to change the wavelength over a wide band at a high speed. Moreover, in order to improve the accuracy of the measurement and analysis, the spectral width of the optical pulse emitted from the optical pulse source should be a narrow band.

However, since the conventional wavelength tunable light source as disclosed in Patent Document 1 emits an ultrashort optical pulse, the spectral width of the generated optical pulse is about 20 nm. For example, when an ultrashort optical pulse having a pulse width of about femtoseconds (fs) to picoseconds (ps) is used as an optical pulse emitted from a light source of an optical tomographic apparatus, the spectral width is preferably about 1 nm in terms of the measurement accuracy. Therefore, a spectral width as large as 20 nm obtained by the light source of Patent Document 1 is by no means sufficient to achieve high measurement accuracy. Accordingly, there has been a demand for a light source that can provide a narrower spectral width.

As the optical pulse used for the optical instruments including the optical tomographic apparatus, a clear output optical pulse with a low pedestal component (noise component) is required. Therefore, when the spectral width of the input optical pulse is narrowed, it is important not only to increase the degree of narrowing of the spectral width sufficiently, but also to provide a narrow optical pulse having a clear waveform with low noise.

The present invention solves the above conventional problems and has an object of providing a method for narrowing a spectral width that also can be adapted to an ultrashort optical pulse emitted from a wavelength tunable light source, and that can provide an output optical pulse with a narrow spectral width and a low noise component, and an optical element and a light source device that use the method for narrowing a spectral width.

Means for Solving Problem

To solve the above problems, a method for narrowing a spectral width of the present invention includes using an optical waveguide member to cause a soliton effect in an input optical pulse within the optical waveguide member, thereby narrowing a spectral width of the input optical pulse to provide an output optical pulse, the optical waveguide member having dispersion characteristics such that an average of a second-order dispersion value ($\beta 2$) with respect to the input optical pulse is negative, and an absolute value of the second-order dispersion value ($\beta 2$) increases in a propagation direction of the input optical pulse.

An optical element of the present invention has dispersion characteristics such that an average of a second-order dispersion value ($\beta 2$) with respect to an input optical pulse is negative, and an absolute value of the second-order dispersion value ($\beta 2$) increases in a propagation direction of the input optical pulse. The optical element causes a soliton effect in the input optical pulse to narrow a spectral width of the input optical pulse, thereby providing an output optical pulse.

A light source device of the present invention includes the following: an optical pulse generator that generates an optical pulse; an amplifier that adjusts an intensity of the generated optical pulse; and the optical element according to the present invention. The light source device emits an optical pulse in which the spectral width has been narrowed.

Effects of the Invention

The method for narrowing a spectral width of the present invention uses the optical waveguide member having the predetermined dispersion characteristics to cause the soliton effect in the input optical pulse, and thus can provide an output optical pulse in which the spectral width has been narrowed with a high narrowing factor, and the pedestal component (noise) is suppressed.

Using the method for narrowing a spectral width of the present invention, the optical element of the present invention can change the input optical pulse in a wide wavelength range to an output optical pulse in which the spectral width has been narrowed with a high narrowing factor, and the pedestal component (noise) is suppressed.

The light source device of the present invention can emit a soliton optical pulse with a narrow spectral width and a low noise component as an output optical pulse.

BRIEF DESCRIPTION OF DRAWING

FIG. 2 is a diagram showing the optical characteristics of communication fibers constituting a comb-like profiled fiber according to an embodiment of the optical element of the present invention.

FIG. 3 is a diagram for explaining a change in the dispersion characteristics of a comb-like profiled fiber according to an embodiment of the optical element of the present invention. FIG. 3A shows a state in which the absolute value of the second-order dispersion value ($\beta 2$) is small. FIG. 3B shows a state in which the absolute value of the second-order dispersion value ($\beta 2$) is in the middle. FIG. 3C shows a state in which the absolute value of the second-order dispersion value ($\beta 2$) is large.

FIG. 9 is a diagram showing the spectral width narrowing in the second light source device that can provide a wavelength tunable optical pulse with a narrow spectral width according to an embodiment of the present invention.

DESCRIPTION OF THE INVENTION

Figure 1:
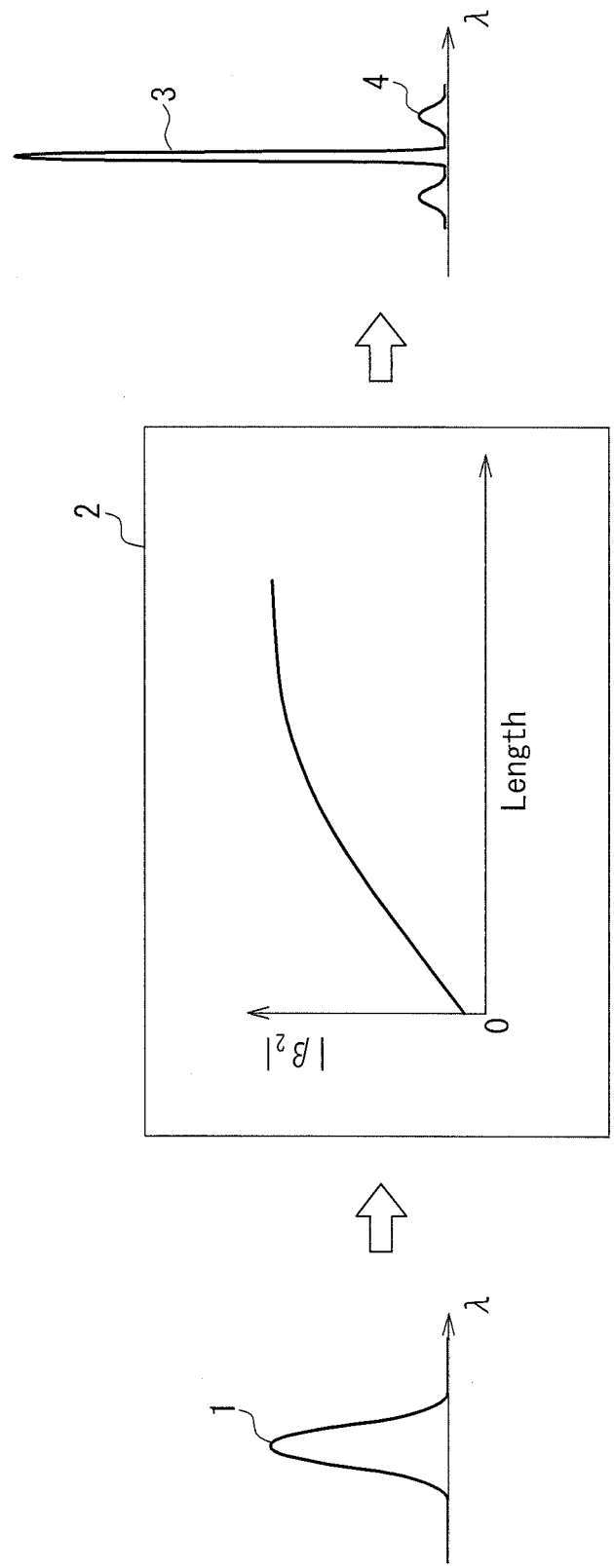
FIG. 1 is a diagram for explaining a spectral width narrowing method of the present invention.

A method for narrowing a spectral width of the present invention includes using an optical waveguide member to cause a soliton effect in an input optical pulse within the optical waveguide member, thereby narrowing a spectral width of the input optical pulse to provide an output optical pulse, the optical waveguide member having dispersion characteristics such that an average of a second-order dispersion value ($\beta 2$) with respect to the input optical pulse is negative, and an absolute value of the second-order dispersion value ($\beta 2$) increases in a propagation direction of the input optical pulse.

With this configuration, as the optical pulse propagates in the optical waveguide member, the spectral width of the optical pulse becomes narrower due to the soliton effect of maintaining the soliton pulse characteristics. Therefore, optimizing the degree of the increase in the absolute value of the second-order dispersion value ($\beta 2$) of the optical waveguide member in accordance with the center wavelength or intensity of the input optical pulse can provide an output optical pulse in which a high narrowing factor is achieved, and the pedestal component is suppressed.

In the method for narrowing a spectral width of the present invention, it is preferable that an optical fiber is used as the optical waveguide member. The optical fiber can transmit the input optical pulse efficiently, and have desired characteristics relatively easily.

Moreover, it is preferable that the optical waveguide member is configured by connecting a plurality of optical fibers, which differ in the second-order dispersion value ($\beta 2$). By connecting a plurality of optical fibers with different second-order dispersion values ($\beta 2$), the optical waveguide member having desired dispersion characteristics easily can be provided compared to the use of a single optical fiber.

Further, it is preferable that the optical waveguide member is configured by connecting a plurality of optical fibers, which differ from each other in the second-order dispersion value ($\beta 2$), in sequence so that the plurality of optical fibers are combined while varying a length ratio, and thus the optical waveguide member has dispersion characteristics such that the absolute value of the second-order dispersion value ($\beta 2$) increases in the propagation direction of the input optical pulse. With this configuration, the optical waveguide member having desired dispersion characteristics can be provided using commercially available optical fibers without the need to manufacture another optical fiber with a special second-order dispersion value ($\beta 2$).

An optical element of the present invention has dispersion characteristics such that an average of a second-order dispersion value ($\beta 2$) with respect to an input optical pulse is negative, and an absolute value of the second-order dispersion value ($\beta 2$) increases in a propagation direction of the input optical pulse. The optical element causes a soliton effect in the input optical pulse to narrow a spectral width of the input optical pulse, thereby providing an output optical pulse.

With this configuration, the optical element using the method for narrowing a spectral width of the present invention can provide an output optical pulse in which a high narrowing factor is achieved, and the pedestal component is suppressed.

The optical element of the present invention may include a plurality of optical fibers, which differ in the second-order dispersion value ($\beta 2$), connected in the propagation direction of the input optical pulse. Moreover, the optical element of the present invention may include a plurality of optical fibers, which differ from each other in the second-order dispersion value ($\beta 2$), connected in sequence so that the plurality of optical fibers are combined while varying a length ratio, and thus has dispersion characteristics such that the absolute value of the second-order dispersion value ($\beta 2$) increases in the propagation direction of the input optical pulse. With this configuration, the optical element having desired dispersion characteristics can be easily provided.

A light source device of the present invention includes the following; an optical pulse generator that generates an optical pulse; an amplifier that adjusts an intensity of the generated optical pulse; and the optical element according to the present invention. The light source device emits an optical pulse in which the spectral width has been narrowed.

With this configuration, the light source device using the method for narrowing a spectral width of the present invention can emit a soliton optical pulse with a narrow spectral width and a low noise component as an output optical pulse.

It is preferable that the optical pulse generator includes a short pulse laser light source, a light intensity regulator, and a wavelength tunable optical fiber, and serves as a wavelength tunable light source that is capable of changing a wavelength of an optical pulse to be generated by adjusting an intensity of a short pulse laser beam input to the wavelength tunable optical fiber with the light intensity regulator. With this configuration, a narrow spectral width light source that is capable of changing the wavelength over a wide band at a high speed can be put to practical use.

Hereinafter, an embodiment of the present invention will be described with reference to the drawings.

(Spectral Width Narrowing Method)

First, the principle and content of a spectral width narrowing method of the present invention will be described.

FIG. 1 is a conceptual diagram for explaining the principle of the spectral width narrowing method of the present invention.

As shown in FIG. 1, in the spectral width narrowing method of the present invention, a soliton wave 1 (input optical pulse) is introduced into an optical waveguide member 2 that is an optical element for narrowing a spectral width, and then an output optical pulse 3 is generated in which the spectral width has been narrowed.

The optical waveguide member 2 has dispersion characteristics such that the absolute value of a second-order dispersion value ($\beta 2$) of wavelength dispersion increases in the longitudinal direction, i.e., the propagation direction of the input optical pulse, as shown in FIG. 1. Although FIG. 1 shows only the absolute value of the second-order dispersion value ($\beta 2$), the optical waveguide member 2 used for the spectral width narrowing method of the present invention is limited to the configuration in which the average of the whole second-order dispersion value ($\beta 2$) is negative. Therefore, it also can be described that the second-order dispersion value ($\beta 2$) of the optical waveguide member 2 changes to a larger negative value with a distance in the propagation direction of the input optical pulse, i.e., in the longitudinal direction.

The soliton wave 1 entering the optical waveguide member 2 having the above dispersion characteristics propagates while maintaining the soliton waveform due to the soliton effect, and the spectral width is narrowed.

The soliton wave can be expressed by the following formula 1 that gives the soliton order (N).

$$N^2 = \frac{\gamma P_0 T_{FWHM}^2}{3.11|\beta_2|} \rightarrow \quad \text{[Formula 1]}$$

-continued $$1 \begin{cases} N: \text{Soliton order} \\ \gamma: \text{Nonlinear coefficient} \\ P_0: \text{Peak power} \\ T_{FWHM}: \text{Temporal full width at half maximum} \\ \beta_2: \text{Second-order dispersion value} \end{cases}$$

The numerator on the right side of the formula 1 represents the self-phase modulation of the optical pulse, and the denominator on the right side of the formula 1 represents the wavelength dispersion. As described above, upon entering the optical waveguide member 2 having the dispersion characteristics in which the average of the whole second-order dispersion value ($\beta 2$) is negative, and in which the absolute value of the second-order dispersion value ($\beta 2$) increases in the propagation direction of the input optical pulse, the soliton wave 1 propagates while maintaining the time waveform due to the interaction between the nonlinear effect and the wavelength dispersion of the optical waveguide member 2, so that the soliton waveform is maintained. Therefore, when an optical pulse with a soliton order of 0.5 to 1.5 is introduced into the optical waveguide member 2, the value $N^2$ of the formula 1 converges to 1. Since the absolute value of the second-order dispersion value ($\beta 2$) of the optical waveguide member 2 increases in the propagation direction of the optical pulse, the temporal full width at half maximum ($T_{FWHM}$) of the input soliton wave 1 is increased so as to maintain the soliton pulse characteristics, and consequently the spectral width is narrowed.

In the spectral width narrowing method of the present invention, as the optical pulse propagates in the optical waveguide member 2 having the dispersion characteristics in which the absolute value of the second-order dispersion value ($\beta 2$) increases, the spectral width of the optical pulse becomes narrower due to the soliton effect. Therefore, the spectral width of the input optical pulse 1 can be narrowed by adjusting the profile of the second-order dispersion value ($\beta 2$) in accordance with the wavelength or intensity of the input optical pulse and the length of the optical waveguide member for narrowing the spectral width.

Moreover, the spectral width narrowing method of the present invention uses the effect of maintaining the soliton waveform of the optical pulse to narrow the spectral width. Therefore, the output optical pulse 3 becomes a clear solitary wave. Thus, the generated output optical pulse 3 can have an almost ideal waveform with a low pedestal component (noise).

(Optical Element)

Next, a specific example of the optical waveguide member, i.e., the optical element used for the spectral width narrowing method of the present invention will be described as an embodiment.

The optical element of this embodiment is an optical fiber that serves as the optical waveguide member having the dispersion characteristics in which the average of the second-order dispersion value ($\beta 2$) with respect to the input optical pulse is negative, and in which the absolute value of the second-order dispersion value ($\beta 2$) increases in the propagation direction of the input optical pulse.

The optical fiber can have various dispersion characteristics depending on the materials or diameters of a core and a clad. Therefore, it is not impossible to manufacture an optical fiber in which the average of the second-order dispersion value ($\beta 2$) with respect to the input optical pulse is negative, and the absolute value of the second-order dispersion value ($\beta 2$) increases in the propagation direction of the input optical pulse. However, it is difficult to change the dispersion characteristics continuously. Thus, instead of using a single fiber to achieve desired dispersion characteristics, a plurality of different optical fibers having negative second-order dispersion values ($\beta 2$) are connected in sequence so that the absolute value of each of the second-order dispersion values ($\beta 2$) gradually increases. Consequently, the connected optical fiber as a whole can have desired dispersion characteristics. In this manner, although an optical transmission loss occurs at the splices of the optical fibers, the individual optical fibers only need to have uniform dispersion characteristics over the entire length, and therefore it is very easy to manufacture an optical element in which the dispersion characteristics are continuously changed.

Examples of the specific method for obtaining a predetermined second-order dispersion value ($\beta 2$) of a fiber include the following: adjusting the magnitude of the refraction index by adding an additive to a glass material and adjusting the concentration of the additive; adjusting the refractive index distribution on the cross section; and controlling the cross-sectional structure using a microstructure. For example, the absolute value of the second-order dispersion value ($\beta 2$) can be increased as the core diameter of the fiber becomes larger.

In order to achieve the optical waveguide member having desired dispersion characteristics more easily, a comb-like profiled fiber is used as the optical element of this embodiment. The comb-like profiled fiber is composed of two types of optical fibers with different dispersion characteristics. These optical fibers are alternately connected so that the length ratio is varied, thereby changing the second-order dispersion value ($\beta 2$) in the longitudinal direction of the optical fibers.

FIG. 2 is a diagram showing the optical characteristics of fibers used for the comb-like profiled fiber that is the optical element of this embodiment.

Since an ultrashort optical pulse having a center wavelength of 1620 nm is used as the input optical pulse, the comb-like profiled fiber of this embodiment includes a dispersion-shifted fiber (referred to as "DSF" in the following) and a single mode fiber (referred to as "SMF" in the following). The DSF is a commercially available fiber for information communications and serves as a first fiber in which the second-order dispersion value ($\beta 2$) at the center wavelength is negative, and the absolute value of the second-order dispersion value ($\beta 2$) is relatively small. The SMF is a commercially available fiber for information communications and serves as a second fiber in which the second-order dispersion value ($\beta 2$) at the center wavelength is negative, and the absolute value of the second-order dispersion value ($\beta 2$) is relatively large.

More specifically, the DSF is the fiber for information communications "FutureGuide-DS Dispersion-Shifted Single-Mode Fiber" (trade name) manufactured by Fujikura Ltd., and the SMF is the fiber for information communications "FutureGuiude-SM Single-Mode Fiber" (trade name) manufactured by Fujikura Ltd.

Figure 2A:
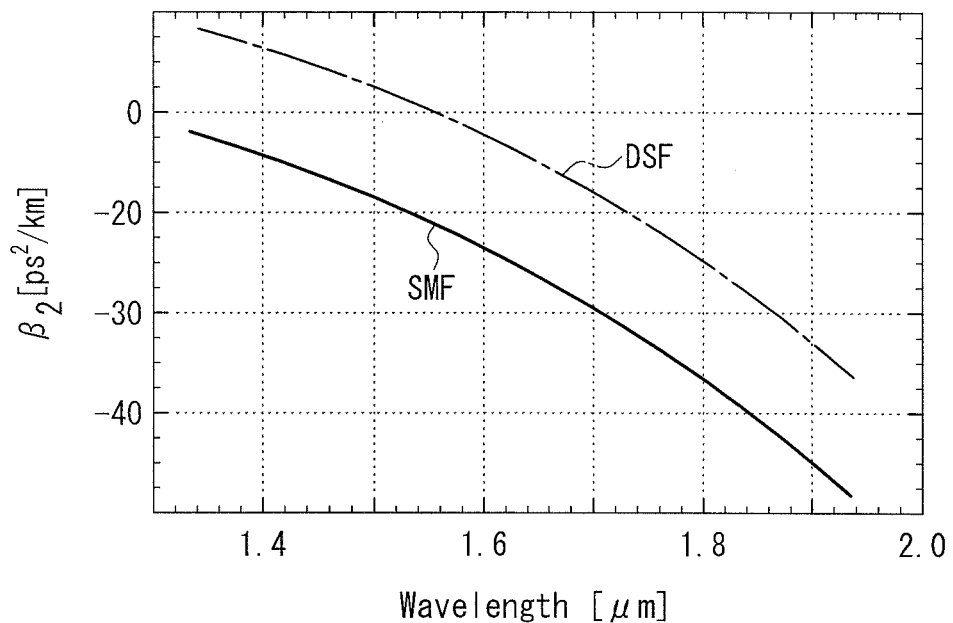
FIG. 2A shows the relationship between the wavelength and the second-order dispersion value ($\beta 2$).

FIG. 2A is a diagram showing changes in the second-order dispersion value ($\beta 2$) with the center wavelength of the input optical pulse in the DSF and the SMF, respectively, which are used for the comb-like profiled fiber of this embodiment.

As shown in FIG. 2A, the second-order dispersion value ($\beta 2$) is derived from the above formula 1 of the soliton order ($N^2$) and expressed in [ps$^2$/km]. It should be noted that the second-order dispersion value ($\beta 2$) differs from a dispersion value expressed in [ps$^2$/nm/km] of wavelength dispersion (D) that generally is described as the dispersion characteristics of optical fibers in catalogs of wire manufacturers. In particular, attention should be paid to the fact that the characteristics of the second-order dispersion value ($\beta 2$) are quite opposite to those of the wavelength dispersion (D). Specifically, for the second-order dispersion value ($\beta 2$) of this embodiment, the positive value indicates normal dispersion and the negative value indicates anomalous dispersion. In contrast, for the wavelength dispersion (D), the negative value indicates normal dispersion and the positive value indicates anomalous dispersion.

As shown in FIG. 2A, both the DSF and the SMF used for the comb-like profiled fiber (optical element) of this embodiment have negative second-order dispersion values ($\beta 2$) at the center wavelength (1620 nm) of the input optical pulse. Moreover, the absolute value of the second-order dispersion value ($\beta 2$) is larger in the SMF than in the DSF.

As will be described later in a second light source device of the present invention, the center frequency of the input optical pulse varies when the spectral width of the input optical pulse is narrowed by the comb-like profiled fiber (optical element) of this embodiment. In such a case, to suppress the pedestal component (noise component) of the output optical pulse from the comb-like profiled fiber in a wide center frequency range, it is preferable to use a fiber in which a change in the second-order dispersion value ($\beta 2$) with the center wavelength of the input optical pulse (as shown in FIG. 2A) is flattened further.

Figure 2B:
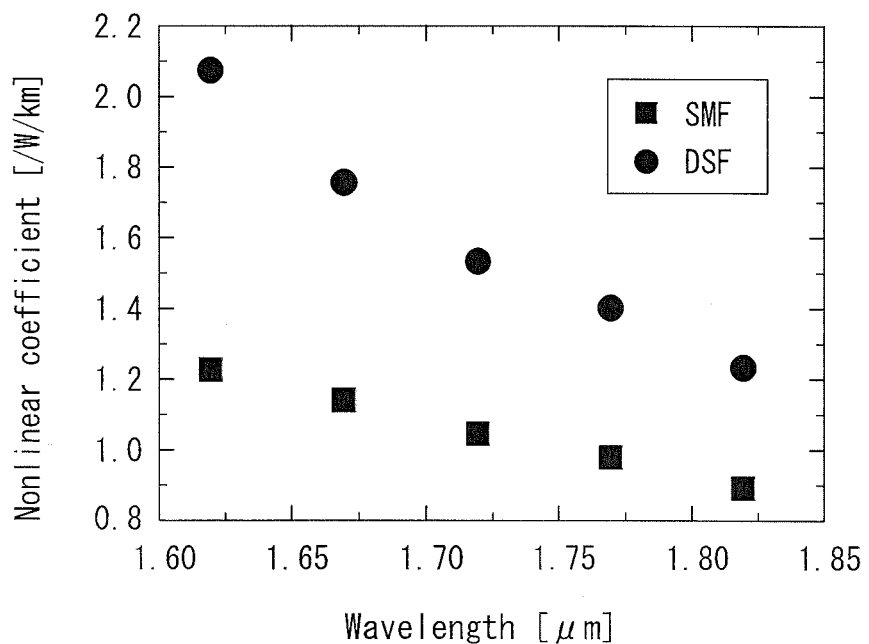
FIG. 2B shows the relationship between the wavelength and the nonlinear coefficient.

FIG. 2B is a diagram showing changes in the nonlinear coefficient with the center wavelength of the input optical pulse in the DSF and the SMF, respectively, which are used for the comb-like profiled fiber of this embodiment.

As shown in FIG. 2B, in the DSF and the SMF used for the comb-like profiled fiber (optical element) of this embodiment, the nonlinear coefficient of the DSF is larger than that of the SMF in the vicinity of the center wavelength (1620 nm) of the input optical pulse. In the optical element of this embodiment, the nonlinear coefficient distribution itself does not have any particular meaning in terms of narrowing the spectral width, and therefore is not a problem as long as it is within the normal range.

FIG. 3 shows the principle of how a predetermined second-order dispersion value ($\beta 2$) can be obtained by varying the length ratio of two fibers DSF and SMF of the comb-like profiled fiber of this embodiment.

In each of FIGS. 3A, 3B, and 3C, the SMF 11 is located on the left side of the drawing and has a large absolute value of the second-order dispersion value ($\beta 2$), and the DSF 12 is located on the right side of the drawing and has a small absolute value of the second-order dispersion value ($\beta 2$). Moreover, in each of FIGS. 3A, 3B, and 3C, the upper diagram is a conceptual diagram showing the length ratio of the SMF 11 and the DSF 12, and the lower diagram shows the magnitude of the absolute value of the second-order dispersion value ($\beta 2$). Further, FIGS. 3A, 3B, and 3C show, in this order, the states of a comb-like profiled fiber 10 in the input end, the middle portion, and the output end of the optical pulse, respectively. For ease of understanding of the configuration of the comb-like profiled fiber 10, only the DSF 12 is hatched in the upper conceptual diagram of the fiber length.

As shown in the upper diagram of FIG. 3A, at the optical pulse input end of the comb-like profiled fiber 10, the ratio of the length of the SMF 11 with a large absolute value of the second-order dispersion value ($\beta 2$) is about 20% of the entire length, and the ratio of the length of the DSF 12 with a small absolute value of the second-order dispersion value ($\beta 2$) is about 80% of the entire length. With this configuration, the average 13 of the second-order dispersion value (β2) in a predetermined section of the fiber shown in FIG. 3A is drawn to the DSF 12 because of its large length ratio and is reduced to a relatively small value, as shown in the lower diagram of FIG. 3A.

As shown in the upper diagram of FIG. 3B, in the middle portion of the comb-like profiled fiber 10, the ratio of the length of the SMF 11 with a large absolute value of the second-order dispersion value (β2) is about 75% of the entire length, and the ratio of the length of the DSF 12 with a small absolute value of the second-order dispersion value (β2) is about 25% of the entire length. With this configuration, the average 13 of the second-order dispersion value (β2) in a predetermined section of the fiber shown in FIG. 3B is drawn to the SMF 11 because of its large length ratio and is increased to a relatively large value, as shown in the lower diagram of FIG. 3B.

As shown in the upper diagram of FIG. 3C, at the optical pulse output end of the comb-like profiled fiber 10, the ratio of the length of the SMF 11 with a large absolute value of the second-order dispersion value (β2) is about 90% of the entire length, and the ratio of the length of the DSF 12 with a small absolute value of the second-order dispersion value (β2) is about 10% of the entire length. With this configuration, the average 13 of the second-order dispersion value (β2) in a predetermined section of the fiber shown in FIG. 3C is increased to a larger value, as shown in the lower diagram of FIG. 3C.

As described above, the magnitude of the second-order dispersion value (β2) in the predetermined section can be controlled by varying the length ratio of the SMF 11 and the DSF 12 that constitute the comb-like profiled fiber 10. As shown in FIGS. 3A, 3B, and 3C, the proportion of the SMF 11 with a large absolute value of the second-order dispersion value (β2) is being increased, while the proportion of the DSF 12 with a small absolute value of the second-order dispersion value (β2) is being reduced, so that the average of the absolute value of the second-order dispersion value (β2) in the predetermined section gradually can be increased. Thus, when the comb-like profiled fiber 10 is seen as a whole, the optical element has the dispersion characteristics in which the absolute value of the second-order dispersion value (β2) increases along the propagation direction of the input optical pulse.

Figure 4:
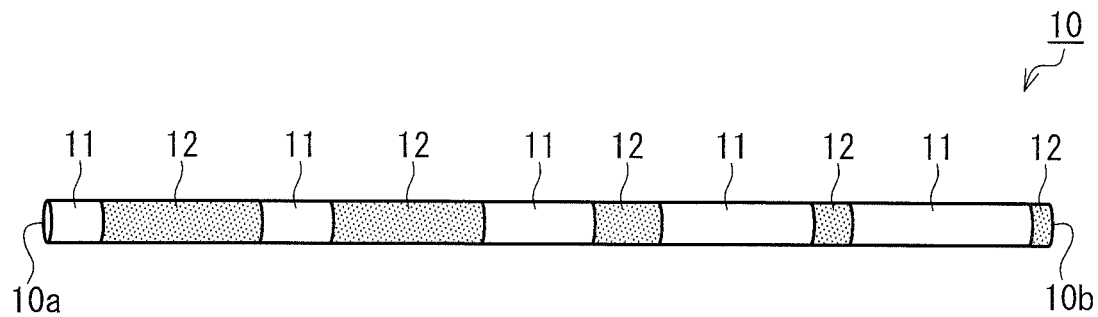
FIG. 4 is a conceptual diagram showing the schematic configuration of a comb-like profiled fiber according to an embodiment of the optical element of the present invention.

FIG. 4 is a conceptual diagram showing the overall configuration of the comb-like profiled fiber 10 of this embodiment. Similarly to the upper diagram in each of FIGS. 3A, 3B, and 3C, FIG. 4 shows changes in the length of the SMF 11 and the DSF 12, and only the DSF 12 is hatched.

As shown in FIG. 4, in the comb-like profiled fiber 10 of this embodiment, the proportion of the SMF 11 with a large absolute value of the second-order dispersion value (β2) is increased and the proportion of the DSF 12 with a small absolute value of the second-order dispersion value (β2) is reduced along the propagation direction of the optical pulse from the optical pulse input end 10a located on the left side of FIG. 4 to the optical pulse output end 10b located on the right side of FIG. 4. With this configuration, it is possible to provide the optical element in which the absolute value of the second-order dispersion value (β2) in each section of the fiber increases along the propagation direction of the optical pulse.

As shown in FIG. 4, in the comb-like profiled fiber 10 of this embodiment, the SMF 11 with a large absolute value of the second-order dispersion value (β2) and the DSF 12 with a small absolute value of the second-order dispersion value (β2) are arranged alternately so that the length ratio is varied. However, in the comb-like profiled fiber 10 of this embodiment, the average of the second-order dispersion value (β2) in view of the length ratio of the two types of fibers SMF 11 and DSF 12 only needs to have desired dispersion characteristics in the propagation direction of the optical pulse. Therefore, it is not absolutely essential to arrange the two types of fibers alternately, as shown in FIG. 4. In principle, the DSF 12 may be located after the SMF 11 in the first section, and the SMF 11 may be located after the DSF 12 in the subsequent section.

As described above, when the two types of fibers SMF 11 and DSF 12 are arranged in a different order, and the fibers of the same type are successively connected, it is preferable that two successive fibers are replaced by a single wire having the same length as the total length of the two successive fibers so as to prevent loss caused by fusion. However, it should be noted that if the total length of the successive fibers of the same type is long, the average of the second-order dispersion value (β2) in this section is not set to a predetermined value, and thus the proper pulse width narrowing effect may not be exerted on the optical pulse propagating in the fiber.

In FIGS. 3 and 4, for convenience of explanation, the length of the combination of a pair of SMF and DSF, i.e., the length of a pair of fibers combined to obtain the average of the predetermined second-order dispersion value (β2) is constant over the entire length of the comb-like profiled fiber 10. However, in the comb-like profiled fiber 10 of this embodiment, it is not absolutely essential to keep the length of a pair of fibers constant over the entire length of the comb-like profiled fiber 10. Since the second-order dispersion value (β2) in a predetermined section of the comb-like profiled fiber 10 is determined by the ratio of the SMF 11 and the DSF 12 in this section, even if the length of a pair of fibers is changed in the longitudinal direction of the comb-like profiled fiber 10, the average of the second-order dispersion value (β2) in this section can be set to a desired value.

Figure 5:
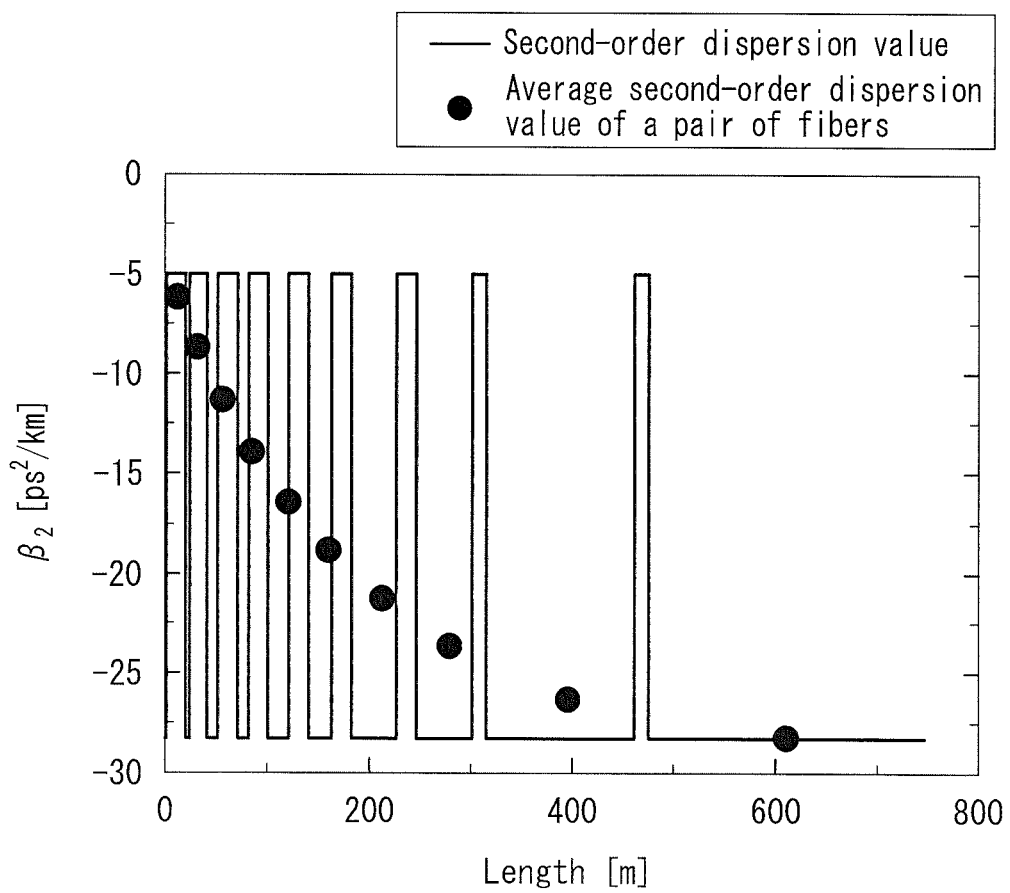
FIG. 5 is a diagram showing the second-order dispersion value ($\beta 2$) characteristics of a comb-like profiled fiber according to an embodiment of the optical element of the present invention.

FIG. 5 is a diagram showing changes in the second-order dispersion value (β2) and the average second-order dispersion value (β2) in each section of the comb-like profiled fiber in the longitudinal direction. The average second-order dispersion value (β2) is determined from the length ratio of the SMF and the DSF that constitute the comb-like profiled fiber.

As shown in FIG. 5, the comb-like profiled fiber of this embodiment includes the SMF with a second-order dispersion value (β2) of about −5 and the DSF with a second-order dispersion value (β2) of about −28. Therefore, the actual second-order dispersion value (β2), which is indicated by a solid line in FIG. 5, repeatedly changes between "−5" and "−28". On the other hand, the average of the second-order dispersion value (β2) of the SMF and the DSF, which is indicated by a black dot in FIG. 5, remains negative and gradually decreases (i.e., the absolute value increases) along the propagation direction of the optical pulse.

Accordingly, the use of the comb-like profiled fiber of this embodiment can provide an optical element in which the average of the second-order dispersion value (β2) gradually decreases (i.e., the absolute value increases), and the second-order dispersion value (β2) changes from −5 to −28 over the entire length of 740 m.

Figure 6:
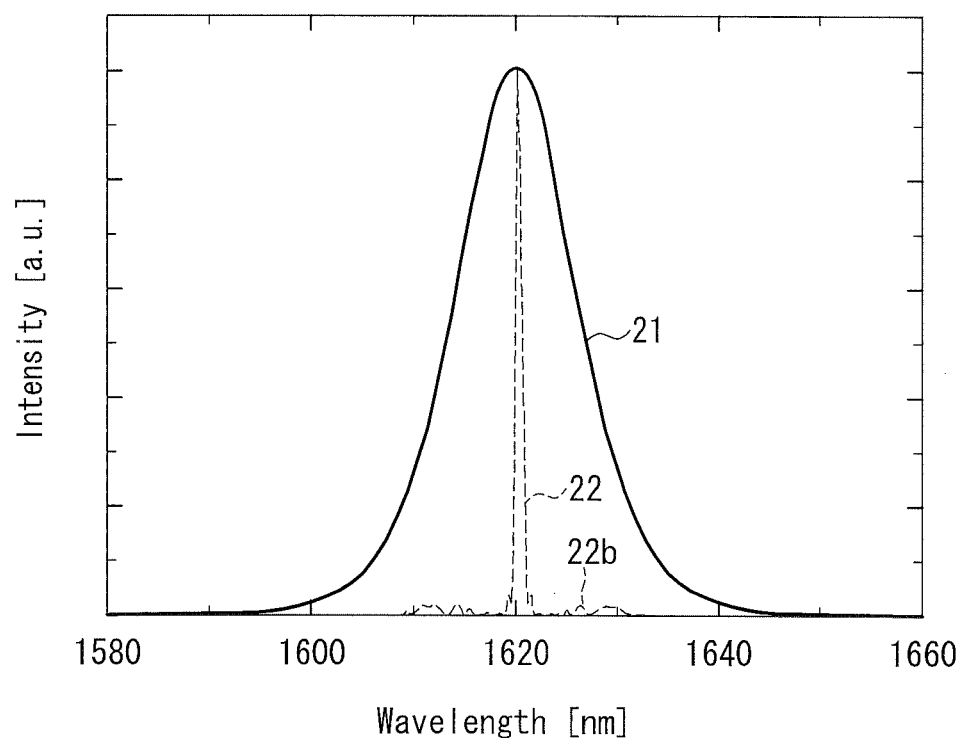
FIG. 6 is a diagram showing the spectral widths of input and output optical pulses of an ultrashort optical pulse, in which the spectral width of the ultrashort optical pulse is narrowed by an optical element of the present invention.

The present inventors confirmed that it is preferable that the rate of change of the average of the second-order dispersion value (β2) of the SMF and the DSF, which is indicated by a black dot in FIG. 5, decreases with the inverse of the length in the longitudinal direction so that, e.g., the second-order dispersion value (β2) satisfies the relationship of "A (initial value)−B (constant)/L (length)". FIG. 6 is a diagram showing the effect of narrowing the spectral width in the comb-like profiled fiber of this embodiment, which has the configuration as shown in FIG. 4 and the profile of the second-order dispersion value (β2) as shown in FIG. 5.

As shown in FIG. 6, when a soliton wave 21 (input optical pulse) having a center wavelength of 1620 nm propagates in the comb-like profiled fiber 10 of this embodiment, the spectral width is narrowed, and then an output optical pulse 22 is provided, as indicated by a dotted line in FIG. 6.

Using the comb-like profiled fiber 10 of this embodiment, the spectral width (half-width) is narrowed from 13.8 nm for the input optical pulse 21 to 0.72 nm for the output optical pulse 22. In this case, the narrowing factor is 19. Moreover, the magnitude of a pedestal component 22b of the waveform produced by narrowing in the comb-like profiled fiber 10 is −18.0 dB from the peak of the spectrum.

As described above, it is confirmed that the comb-like profiled fiber of this embodiment can narrow the spectral width of the ultrashort optical pulse significantly while suppressing the noise component.

In order to study what kind of dispersion characteristics of the second-order dispersion value ($\beta 2$) the optical element (optical waveguide member) should have in the propagation direction of the optical pulse, it is preferable that the optical fiber is optimally designed by calculating the pulse propagation in the optical fiber. In general, the average dispersion value needs to be changed gradually so that the propagating pulse does not deviate greatly from the soliton condition of N=1 in order to obtain the optical pulse having a better spectral shape.

The above comb-like profiled fiber includes two types of communication fibers with different second-order dispersion values ($\beta 2$), and the length ratio of these fibers is varied to obtain desired dispersion characteristics of the whole comb-like profiled fiber. However, the comb-like profiled fiber of this embodiment is not limited to such two types of fibers. For example, three or more types of fibers with different second-order dispersion values ($\beta 2$) may be combined so that the length ratio of these fibers is varied, which results in a comb-like profiled fiber having predetermined second-order dispersion value ($\beta 2$) characteristics.

As a plurality of fibers that have the second-order dispersion value ($\beta 2$) characteristics and are used to form a single comb-like profiled fiber, it is not necessary to always use the same type of fibers. For example, different types of fibers having appropriate second-order dispersion value ($\beta 2$) characteristics may be combined in each section of the comb-like profiled fiber in the longitudinal direction, so that the second-order dispersion value ($\beta 2$) in each section can be set to a desired value.

(Light Source Device)

Next, a light source device of the present invention will be described by way of specific examples.

Figure 7:
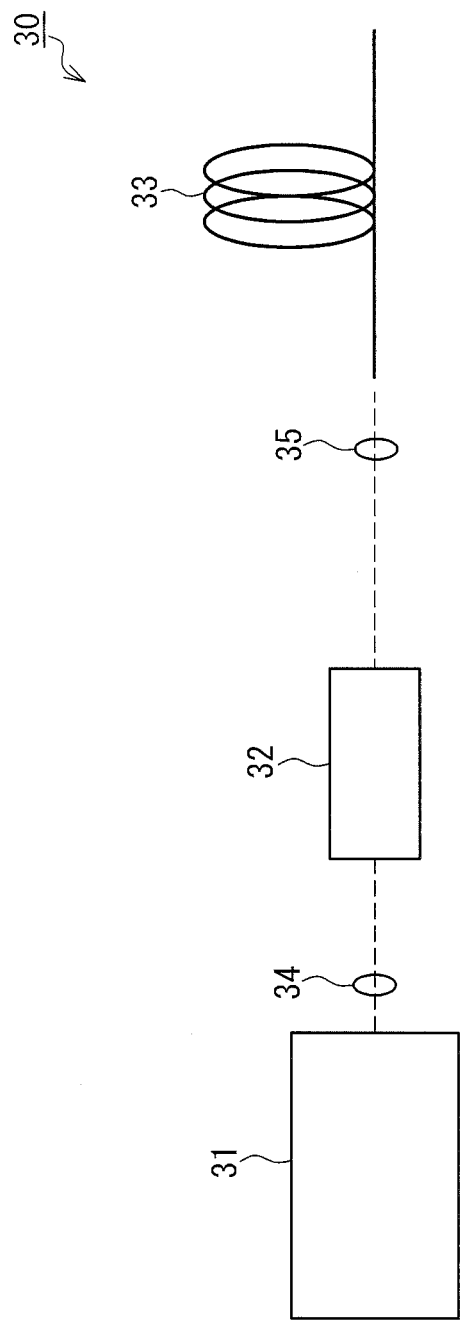
FIG. 7 is a block diagram showing the schematic configuration of a first light source device that emits an optical pulse with a narrow spectral width according to an embodiment of the present invention.

FIG. 7 is a block diagram showing the overall configuration of a light source device 30 capable of emitting a short optical pulse with a narrow spectral width, which is a first light source device of this embodiment.

As shown in FIG. 7, the light source device of this embodiment includes the following: an ultrashort optical pulse laser 31 that is an optical pulse generator for generating an optical pulse; an amplifier 32 that adjusts the intensity of the ultrashort optical pulse generated by the ultrashort optical pulse laser 31; and a comb-like profiled fiber 33 that serves as the optical waveguide member described in the above embodiment of the optical element. A lens 34 is provided between the ultrashort optical pulse laser 31 and the amplifier 32 to couple the ultrashort optical pulse from one to another. Moreover, a lens 35 is provided between the amplifier 32 and the comb-like profiled fiber 33 to allow the ultrashort optical pulse output from the amplifier 32 to appropriately enter the comb-like profiled fiber 33 (optical fiber).

The ultrashort optical pulse laser 31 may be an Er (erbium) doped ultrashort pulse fiber laser. As described in the above embodiment of the optical element, the ultrashort optical pulse laser 31 is set to, e.g., a center wavelength of 1560 nm, a pulse width of 200 fs (femtoseconds), and a repetition rate of 50 MHz.

The amplifier 32 is an optical amplifier that can change the magnitude of the gain. The amplifier 32 can amplify the optical pulse output from the ultrashort optical pulse laser 31 (Er doped ultrashort pulse fiber laser), e.g., at a gain of a rare-earth doped fiber.

The comb-like profiled fiber 33 is the same as that described in the above embodiment of the optical element. For example, the comb-like profiled fiber 33 may be a 760 m fiber in which the SMF and the DSF (both are general communication fibers) are alternately connected at a predetermined length ratio.

In the light source device of this embodiment, the optical pulse generator is a laser apparatus that generates an ultrashort optical pulse with a pulse duration on the order of femtoseconds (fs). However, the optical pulse generator of this embodiment is not limited to such an ultrashort optical pulse laser, and an optical pulse source with a pulse duration on the order of picoseconds (ps) to microseconds ($\mu$s) can be used.

Needless to say, the amplifier 32 for amplifying the input optical pulse is not necessary when the energy of the optical pulse generated by the ultrashort optical pulse laser 31 (optical pulse generator) has sufficient intensity for narrowing in the comb-like profiled fiber 33 (optical waveguide member). Moreover, the coupling lenses 34, 35 may be used as needed, and are not essential to the light source device of this embodiment.

Figure 8:
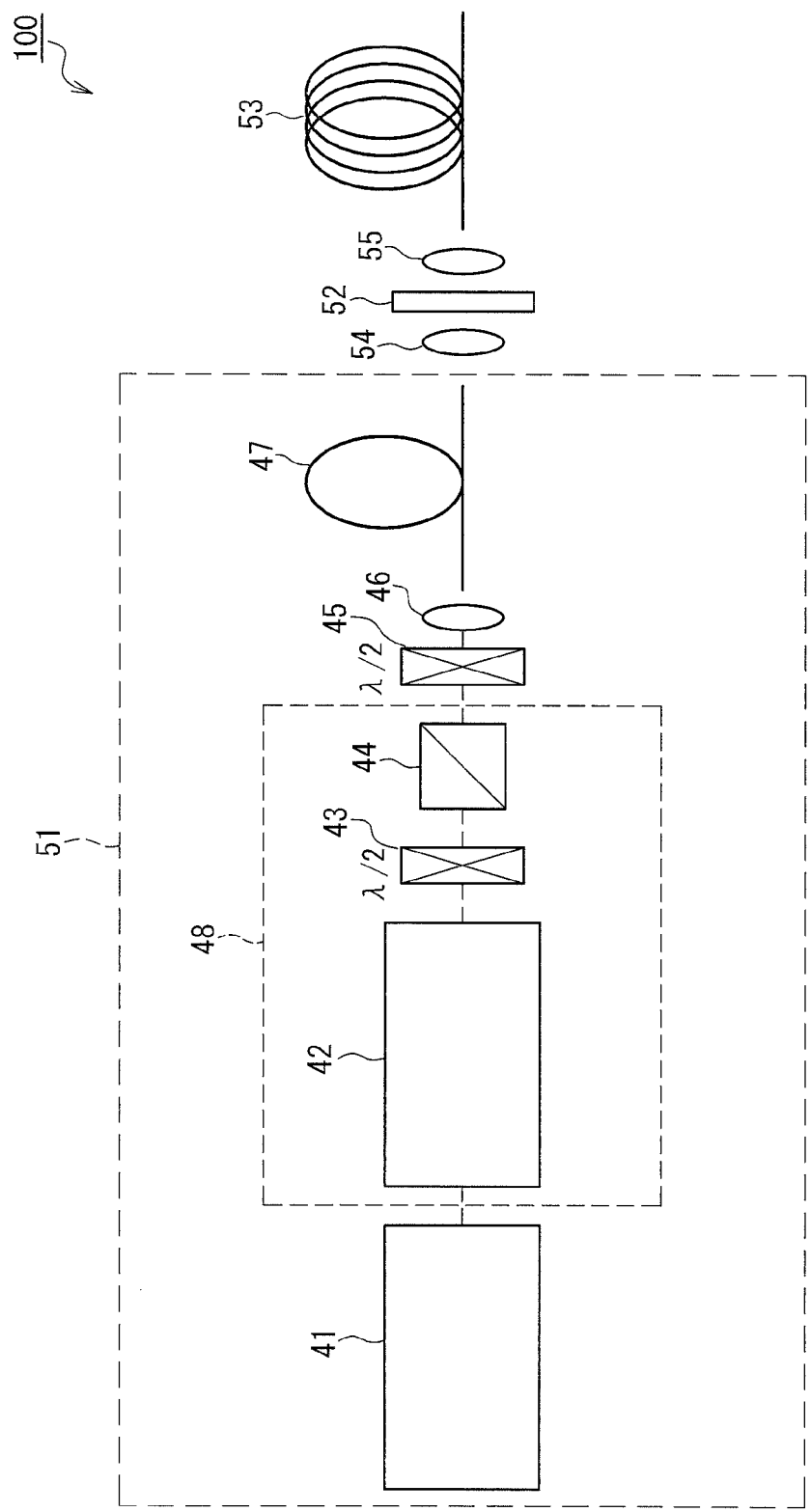
FIG. 8 is a block diagram showing the schematic configuration of a second light source device that can provide a wavelength tunable optical pulse with a narrow spectral width according to an embodiment of the present invention.

FIG. 8 is a block diagram showing the overall configuration of a light source device 100 capable of changing the center wavelength of an output optical pulse and emitting an optical pulse with a narrow spectral width, which is a second light source device of this embodiment.

As shown in FIG. 8, the second light source device 100 of this embodiment includes the following: a wavelength tunable light source 51 that is an optical pulse generator and can perform wavelength conversion of an output optical pulse; an amplifier 52 that adjusts the intensity of the optical pulse output from the wavelength tunable light source 51; and a comb-like profiled fiber 53 that serves as the optical waveguide member. A lens 54 is provided between the wavelength tunable light source 51 and the amplifier 52 to couple the laser beam from one to another. Moreover, a lens 55 is optionally provided between the amplifier 52 and the comb-like profiled fiber 53 to allow the short pulse laser beam output from the amplifier 52 to appropriately enter the comb-like profiled fiber 53 (optical fiber).

The wavelength tunable light source 51 in the second light source device 100 of this embodiment may be the conventional light source disclosed in Patent Document 1.

Specifically, the wavelength tunable light source 51 includes the following: an Er doped ultrashort optical pulse fiber laser 41 that is a short pulse laser light source; an Er doped fiber amplifier 42 that increases the energy of the output optical pulse from the Er doped ultrashort optical pulse fiber laser 41; a $\lambda/2$ wave plate 43 that converts the phase of the output optical pulse from the Er doped fiber amplifier 42; a polarization beam splitter 44; a $\lambda/2$ wave plate 45; a coupling lens 46 that allows the optical pulse to enter a fiber; and an optical fiber 47 for wavelength conversion.

In the wavelength tunable light source 51, the pulse wavelength shifts to the long wavelength side due to the soliton self-frequency shift effect, and thus the center wavelength of the emitted optical pulse is further shifted to the long wavelength side. Specifically, the amount of wavelength shift is controlled by adjusting the intensity of the short pulse laser beam input to the optical fiber, so that a short pulse laser beam to be generated can have a desired wavelength.

In the wavelength tunable light source 51 shown in FIG. 8, the optical pulse emitted from the Er doped ultrashort optical pulse fiber laser 41 passes through the Er doped fiber amplifier 42, the λ/2 wave plate 43, and the polarization beam splitter 44 so that the intensity of the optical pulse is adjusted before it enters the optical fiber 47 for wavelength conversion. However, the portion surrounded by a dotted line 48 in FIG. 8 is not limited to the configuration as illustrated, and other intensity modulators capable of modulating the intensity of the short optical pulse can be used. The λ/2 wave plate 45 and the coupling lens 46 may be used as needed and can be omitted.

As described above, in the second light source device 100 of this embodiment, the optical pulse emitted from the wavelength tunable light source 51 capable of changing the center wavelength of the ultrashort optical pulse (which is disclosed in Patent Document 1) is introduced into the comb-like profiled fiber 53 for narrowing the spectral width (which is the optical element of the present invention). Thus, the second light source device 100 can emit an ultrashort optical pulse in which the spectral width has been narrowed, and the center wavelength can be changed.

FIG. 9 shows the characteristics of an optical pulse emitted from the wavelength tunable light source 51 and the characteristics of an output optical pulse from the comb-like profiled fiber 53 in the second light source device 100 of this embodiment.

Figure 9A:
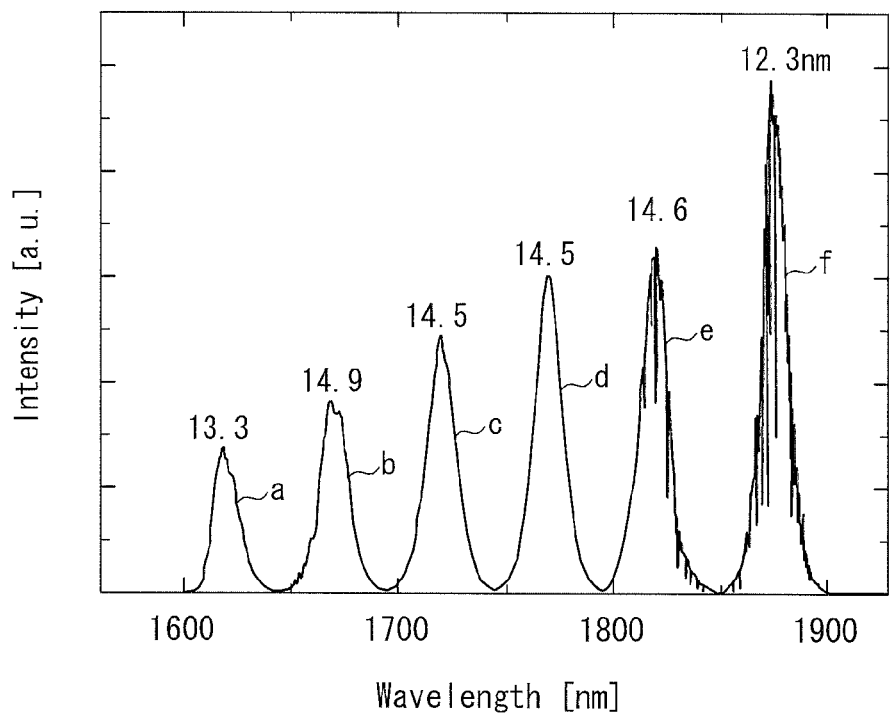
FIG. 9A shows an optical pulse generated by an optical pulse generator.

FIG. 9A shows an optical pulse emitted from the wavelength tunable light source 51 in the second light source device 100.

In the second light source device 100 of this embodiment, the Er doped ultrashort optical pulse fiber laser 41 of the wavelength tunable light source 51 generates an optical pulse with a center wavelength of 1560 nm, a pulse width of 200 fs, and an intensity of 30 mW After the intensity of this optical pulse is adjusted by using the Er doped fiber amplifier 42, the λ/2 wave plate 43, and the polarization beam splitter 44, the optical pulse is introduced into the optical fiber 47 for wavelength conversion. In this case, as shown in FIG. 9A, the waveform of the output optical pulse is shifted from the basic waveform a with a center wavelength of 1620 nm to the long wavelength side in increments of 50 nm, as indicated by the waveforms b, c, d, e, and f. Since the intensity of the optical pulse input to the optical fiber 47 is gradually increased in the wavelength tunable light source 51, the intensity of the output waveform is also increased as it is shifted to the long wavelength side. Thus, the center wavelength of the output optical pulse can be continuously adjusted by the adjustment of the input intensity.

In FIG. 9A, the numerical value above each of the waveforms a to f represents the half-width of the optical pulse. As can be seen from FIG. 9A, the half-width of the optical pulse (a to f) ranges from 12.3 nm to 14.9 nm.

Figure 9B:
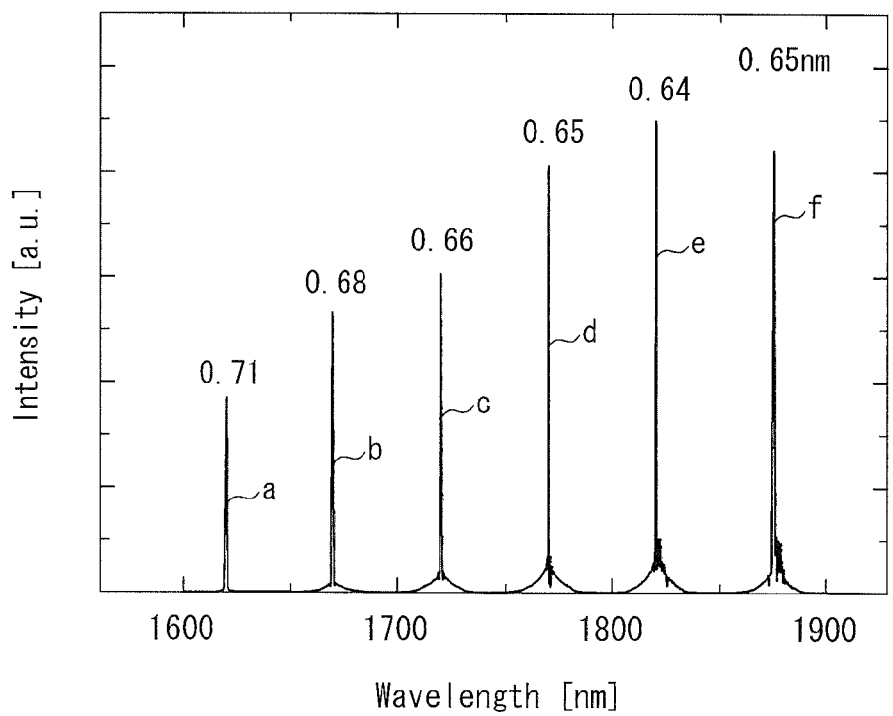
FIG. 9B shows an output optical pulse from the light source device.

FIG. 9B shows the waveform of an output optical pulse from the comb-like profiled fiber 53, i.e., from the second light source device 100 of this embodiment.

In FIG. 9B, as indicated by the half-width above each of the waveforms, the spectral width of the optical pulse from the comb-like profiled fiber 53 has been significantly narrowed to 0.64 nm to 0.71 nm.

In the second light source device 100 of this embodiment, the second-order dispersion value (β2) characteristics of the comb-like profiled fiber 53 are adjusted such that the input optical pulse a with a wavelength of 1620 nm is optimally narrowed. Therefore, as the center wavelength is shifted from 1620 nm to the longer wavelength side, the pedestal component (noise component) is increased. However, as indicated by the waveforms a to f of the output optical pulse in FIG. 9B, the pedestal component of the optical pulse is not large. The results confirm that the light source device 100 has extremely favorable output waveform characteristics as a light source that is capable of changing the center wavelength and emitting an ultrashort optical pulse, which is suitable for various optical measuring apparatuses.

Figure 10:
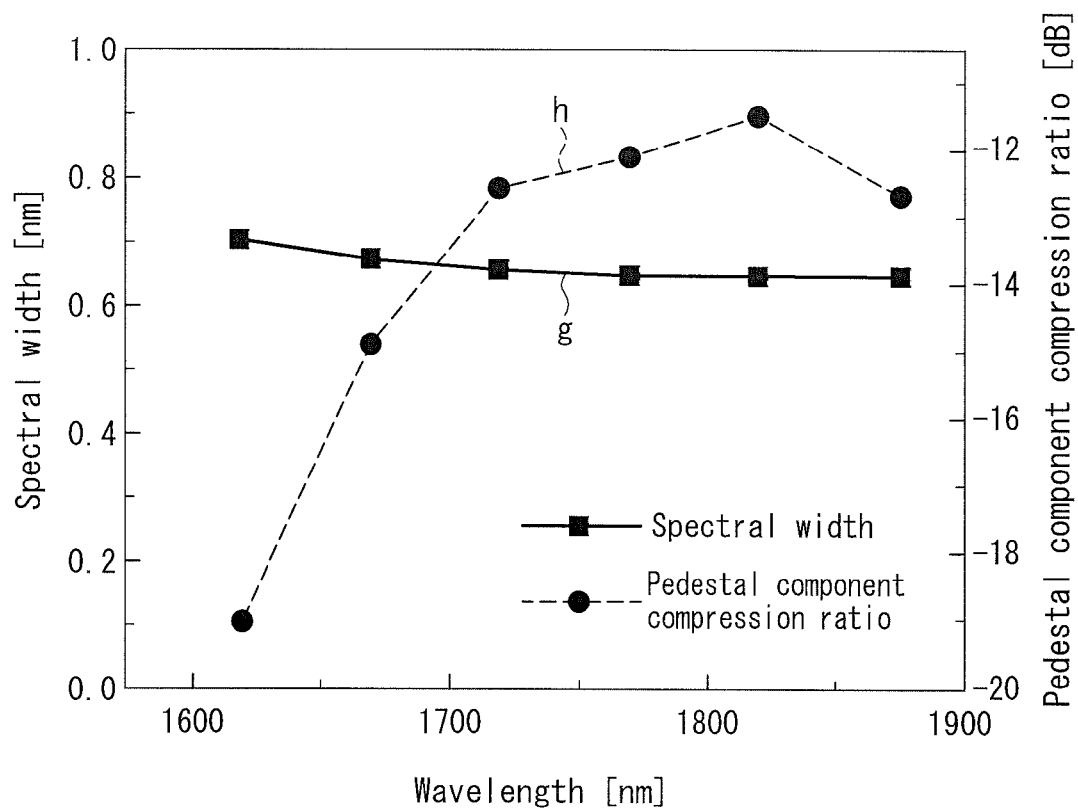
FIG. 10 is a diagram showing the relationship between the center wavelength, the spectral width, and the pedestal component suppression ratio of an output optical pulse emitted from the second light source device that can provide a wavelength tunable optical pulse with a narrow spectral width according to an embodiment of the present invention.

FIG. 10 is a diagram showing the relationship between the center wavelength of the optical pulse that is input to and output from the comb-like profiled fiber 53 and the output waveform characteristics in the second light source device 100 of this embodiment. In FIG. 10, a solid line g represents the relationship between the center wavelength of the input/output optical pulse and the spectral width (half-width), and a dotted line h represents the relationship between the center wavelength of the input/output optical pulse and the suppression ratio of the pedestal component (noise component).

It is evident from FIG. 10 that the output optical pulse from the second light source device 100 of this embodiment has a very narrow spectrum with a substantially constant spectral width, even if the center wavelength is changed from 1620 nm to 1870 nm. Moreover, since the second-order dispersion value (β2) characteristics of the comb-like profiled fiber 53 are adjusted to the optical pulse with a center wavelength of 1620 nm, the value of the pedestal component (side lobe) is increased as the center wavelength is shifted to the long wavelength side. However, the suppression ratio of the pedestal component is maintained at a level of about 12 dB or less with respect to the peak of the output optical pulse while the center wavelength is changed to 1870 nm. Therefore, even if the center wavelength is changed, a stable output optical pulse with a low noise component can be provided.

The above description refers to the light source device of this embodiment in both cases where the center wavelength of the output optical pulse is fixed and where it can be changed. As described above, the light source device of this embodiment uses the optical element of the present invention that can generate the output optical pulse having a narrow spectrum with a low noise component in accordance with the input optical pulse. Therefore, the spectral width of the optical pulse output from the selected optical pulse generator is narrowed, and then this optical pulse can be output from the light source device. Thus, it is possible to provide a light source device that is capable of changing the wavelength over a wide band and emitting an optical pulse with a narrow spectral width, which is required in the fields of optical measurement and opto-electronics.

In the above embodiment of the light source device, the comb-like profiled fiber, which is easy to manufacture, is used as the optical waveguide member. However, the light source device of this embodiment is not limited thereto, and can use the various optical elements of the present invention as the optical waveguide member.

The spectral width narrowing method, the optical element, and the light source device of the present invention have been described above by way of the specific examples, respectively.

In the above description, the optical fiber is used as the optical waveguide member. However, the optical waveguide member of the present invention is not limited to the optical fiber. For example, any optical elements such as a waveguide device and a photonic crystal device may be used as long as they can transmit light and have predetermined second-order dispersion value ($\beta 2$) characteristics.

In the above description, the optical pulse with a soliton order (N) of 0.5 to 1.5 is input to the optical waveguide member. However, the soliton order (N) of the input optical pulse is not limited to the range of 0.5 to 1.5. Nevertheless, if the soliton order (N) of the input optical pulse is less than 0.5 or more than 1.5, the pedestal component may remain somewhat large, and therefore, although the spectral width can be narrowed, the accuracy of the optical pulse may not be sufficiently high for practical applications such as optical measurement.

The optical element using the principle of the spectral width narrowing method of the present invention, and the light source device including this optical element to narrow the spectral width can emit an optical pulse with a narrow spectral width and a low noise component, and therefore can be utilized, e.g., in high-resolution optical coherence tomography (OCT) for medical diagnostic purposes. The ultrahigh-resolution high-speed OCT using the light source of this embodiment is noninvasive and can be expected to have wide applicability in ophthalmology, pulmonology, and other medical fields. In addition to the medical fields, it also can be utilized for the internal inspection or observation means of industrial products.

In particular, the optical element using the principle of the spectral width narrowing method of the present invention, and the light source device including this optical element to narrow the spectral width can achieve a narrow spectral width and suppress the pedestal component (noise component). Therefore, the use of the optical element and the light source device of the present invention in the OCT can provide both high sensitivity (S/N ratio) and a large observation depth.

As applications to the field of spectroscopy, the optical element and the light source device of the present invention can be used as light sources of measuring apparatuses that perform, e.g., the examinations of the environment, exhaust gas, drainage, and water, the internal inspection of a combustion chamber, the plasma measurement, or the like. Moreover, the optical element and the light source device of the present invention can be used as light sources of a laser microscope and a multiphoton microscope for biopsy and cystoscopy. Further, they also can be used as light sources for optical communications and optical signal processing.

Thus, when the optical element using the principle of the spectral width narrowing method of the present invention, and the light source device including this optical element to narrow the spectral width are applied to the field of spectroscopy as described above, the resolving power can be improved due to a narrow spectral width, and the sensitivity can be improved due to a low pedestal component (noise component).

INDUSTRIAL APPLICABILITY

As described above, the spectral width narrowing method, the optical element, and the light source device of the present invention can be expected to have wide applicability in various optical fields including medical OCT, optical measurement, and opto-electronics.

The invention claimed is:
1. A method for narrowing a spectral width of the optical pulse comprising:
   introducing an input optical pulse into an optical waveguide member that causes a soliton effect in the input optical pulse introduced into the optical waveguide member, thereby narrowing a spectral width of the input optical pulse so as to provide an output optical pulse having the narrowed spectral width,
   the optical waveguide member having dispersion characteristics such that:
      an average of a second-order dispersion value (b2) relative to the input optical pulse is negative, and
      an absolute value of the second-order dispersion value (b2) increases, while an increment of the absolute value gradually decreases, in a propagation direction of the input optical pulse.

2. The method for narrowing a spectral width of the optical pulse according to claim 1, wherein the optical waveguide member comprises optical fibers.

3. The method for narrowing a spectral width of the optical pulse according to claim 2, wherein the optical waveguide member is configured by connecting a plurality of the optical fibers, which have different second-order dispersion values (b2) from each other.

4. The method for narrowing a spectral width of the optical pulse according to claim 3,
   wherein the optical waveguide member is configured by connecting the plurality of the optical fibers in sequence, each of which has different second-order dispersion value (b2) from each other, so that:
      the plurality of the optical fibers are connected while varying length ratio between the optical fibers, and
      thus the optical waveguide member has the dispersion characteristics that the absolute value of the second-order dispersion value (b2) increases, while the increment of the absolute value gradually decreases, in the propagation direction of the input optical pulse.

5. The method for narrowing a spectral width of the optical pulse according to claim 4,
   wherein each of the plurality of the optical fibers comprises two or more component fibers having different second-order dispersion value (b2) from each other and being connected in the respective optical fiber, and
   the length ratios between the component fibers vary among the plurality of the optical fibers.

6. An optical element characterized that:
   an average of a second-order dispersion value (b2) relative to an input optical pulse introduced into the optical element is negative, and
   an absolute value of the second-order dispersion value (b2) increases, while an increment of the absolute value gradually decreases, in a propagation direction of the input optical pulse,
   wherein the optical element causes a soliton effect in the input optical pulse to narrow a spectral width of the input optical pulse, thereby providing an output optical pulse having the narrowed spectral width.

7. The optical element according to claim 6, comprising a plurality of optical fibers, which have different the second-order dispersion values (b2) from each other and are connected in the propagation direction of the input optical pulse.

8. The optical element according to claim 7, comprising the plurality of the optical fibers connected in sequence, each of which has different second-order dispersion values (b2) from each other, so that:
   the plurality of the optical fibers are connected while varying length ratios between the optical fibers, and
   thus the optical element has the dispersion characteristics that the absolute value of the second-order dispersion value (b2) increases, while the increment of the absolute value gradually decreases, in the propagation direction of the input optical pulse.

9. A light source device comprising:

an optical pulse generator that generates the input optical pulse;

an amplifier that adjusts an intensity of the generated input optical pulse; and the optical element according to claim 6, wherein the light source device emits the output optical pulse having the narrowed spectral width.

10. The light source device according to claim 9, wherein the optical pulse generator comprises:
 a short pulse laser light source;
 a light intensity regulator; and
 a wavelength tunable optical fiber, and the optical pulse generator serves as a wavelength tunable light source that changes a wavelength of the generated input optical pulse by adjusting an intensity of a short pulse laser beam input to the wavelength tunable optical fiber with the light intensity regulator.

11. The optical element according to claim 8, wherein each of the plurality of the optical fibers comprises two or more component fibers having different second-order dispersion values (b2) from each other and being connected in the respective optical fiber, and the length ratios between the component fibers vary among the plurality of the optical fibers.

\* \* \* \* \*